(12) United States Patent
Wendland

(10) Patent No.: US 9,610,815 B2
(45) Date of Patent: Apr. 4, 2017

(54) RECEIVERS FOR A HEAVY DUTY LOCKING AND PUSHING ASSEMBLIES

(71) Applicant: Donald Wendland, Saginaw, MI (US)

(72) Inventor: Donald Wendland, Saginaw, MI (US)

( * ) Notice: Subject to any disclaimer, the term of this patent is extended or adjusted under 35 U.S.C. 154(b) by 0 days.

(21) Appl. No.: 14/741,566

(22) Filed: Jun. 17, 2015

(65) Prior Publication Data

US 2016/0368337 A1 Dec. 22, 2016

(51) Int. Cl.
*B60D 3/00* (2006.01)

(52) U.S. Cl.
CPC .................................. *B60D 3/00* (2013.01)

(58) Field of Classification Search
CPC ........................................................ B60D 3/00
USPC ............................................... 280/508, 509
See application file for complete search history.

(56) References Cited

U.S. PATENT DOCUMENTS

| | | | | |
|---|---|---|---|---|
| 856,795 A * | 6/1907 | Morris | ................. | B60D 1/04 |
| | | | | 280/509 |
| 2,547,772 A * | 4/1951 | Peters | ................. | B60D 1/04 |
| | | | | 280/509 |
| 2,631,862 A * | 3/1953 | Johnson | ................. | B60S 9/02 |
| | | | | 213/179 |
| 2,783,059 A * | 2/1957 | Hartl | ................. | B60D 1/04 |
| | | | | 280/509 |
| 3,048,934 A * | 8/1962 | Hancock | ................. | E02F 3/6472 |
| | | | | 37/417 |
| 3,455,574 A * | 7/1969 | Priefert | ................. | B60D 1/54 |
| | | | | 280/491.4 |
| 3,606,388 A * | 9/1971 | Campbell | ................. | B60D 3/00 |
| | | | | 280/477 |
| 3,822,756 A | 7/1974 | Martin | | |
| 3,876,023 A | 4/1975 | Hushower et al. | | |
| 3,977,699 A * | 8/1976 | Wagatsuma | ................. | B60D 1/04 |
| | | | | 280/477 |
| 4,013,303 A * | 3/1977 | Milner | ................. | B60D 3/00 |
| | | | | 280/491.4 |
| 4,266,798 A | 5/1981 | Smith | | |
| 4,350,363 A * | 9/1982 | Waddell | ................. | B60D 3/00 |
| | | | | 280/481 |
| 4,398,745 A * | 8/1983 | Azzarello | ................. | B60D 1/04 |
| | | | | 280/508 |
| 4,452,466 A * | 6/1984 | Herbert | ................. | B62D 53/0878 |
| | | | | 280/432 |
| 4,475,741 A * | 10/1984 | Conrad | ................. | A01B 59/004 |
| | | | | 138/44 |
| 4,726,731 A | 2/1988 | Jones | | |
| 4,773,666 A | 9/1988 | Koberlein et al. | | |
| 4,875,526 A | 10/1989 | Latino et al. | | |
| 4,955,754 A * | 9/1990 | Smith | ................. | B60D 3/00 |
| | | | | 293/134 |
| D384,316 S | 9/1997 | Freeman, Jr. | | |
| 5,984,032 A | 11/1999 | Gremillion et al. | | |
| 7,552,938 B1 * | 6/2009 | Williams, Jr. | ................. | B60D 1/155 |
| | | | | 280/479.3 |
| 7,591,477 B2 | 9/2009 | Pohler | | |
| 7,798,241 B2 | 9/2010 | Muzzy et al. | | |
| 7,937,858 B2 | 5/2011 | Roley | | |
| 8,100,426 B2 | 1/2012 | Kronberg | | |

(Continued)

*Primary Examiner* — Kevin Hurley
*Assistant Examiner* — Gabriela C Craciun

(57) ABSTRACT

A receiver for a heavy duty locking and pushing assembly. There is a second embodiment wherein the receiver is controlled by remote control. In a third embodiment, there is a combination of the receiver and a pushing assembly.

3 Claims, 2 Drawing Sheets

(56) References Cited

U.S. PATENT DOCUMENTS

| | | | |
|---|---|---|---|
| 8,141,667 B2 | 3/2012 | Shepard et al. | |
| 8,170,756 B2 * | 5/2012 | Morey | E02F 3/6436 |
| | | | 172/786 |
| 8,620,530 B2 | 12/2013 | Jensen | |
| 9,008,913 B1 * | 4/2015 | Sears | B62D 13/00 |
| | | | 172/264 |
| 2004/0154878 A1 * | 8/2004 | Navarro | B60T 13/08 |
| | | | 188/1.11 E |
| 2005/0001407 A1 * | 1/2005 | Blanton | B60D 1/26 |
| | | | 280/508 |
| 2005/0072581 A1 * | 4/2005 | Miskin | E02F 3/6481 |
| | | | 172/2 |
| 2005/0275194 A1 * | 12/2005 | Wegener | B60D 3/00 |
| | | | 280/500 |
| 2009/0322057 A1 * | 12/2009 | Quenzi | B60P 3/06 |
| | | | 280/423.1 |
| 2012/0086192 A1 * | 4/2012 | Kimener | B60D 1/665 |
| | | | 280/763.1 |
| 2012/0096824 A1 * | 4/2012 | Burger | A01D 45/02 |
| | | | 56/119 |
| 2014/0056676 A1 * | 2/2014 | Wakino | B62D 33/0617 |
| | | | 414/694 |

\* cited by examiner

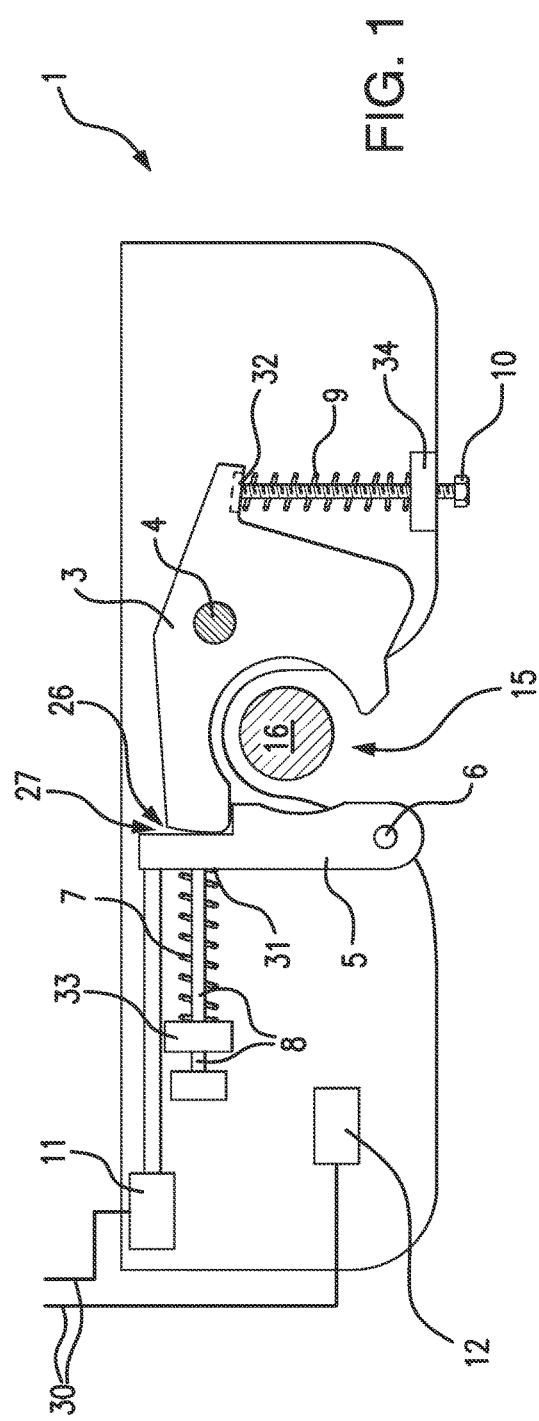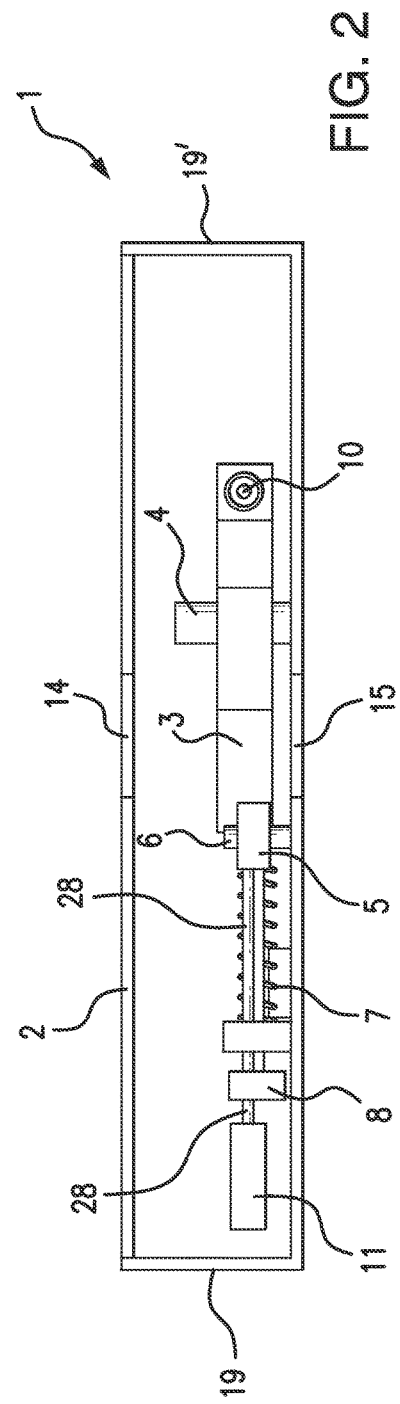

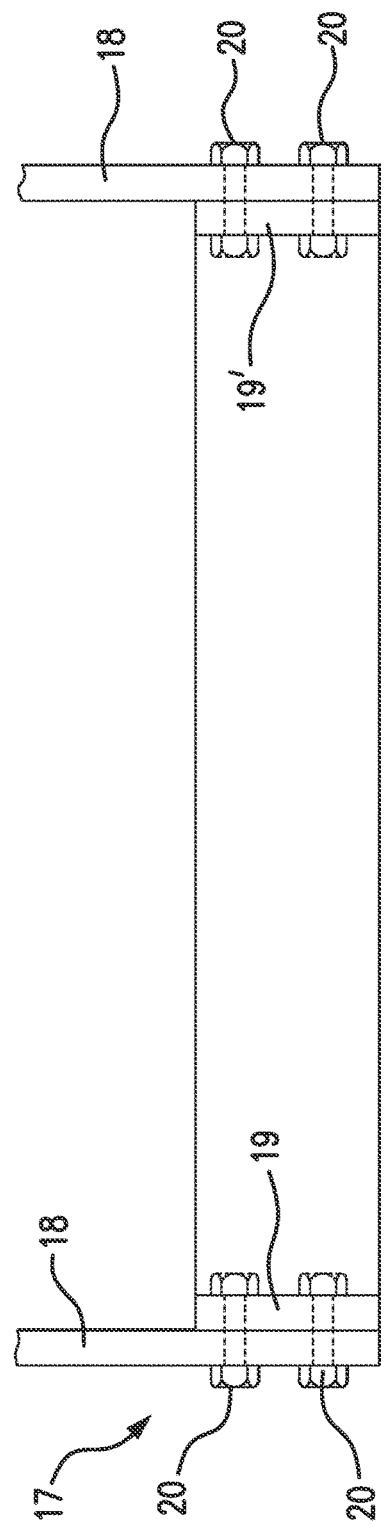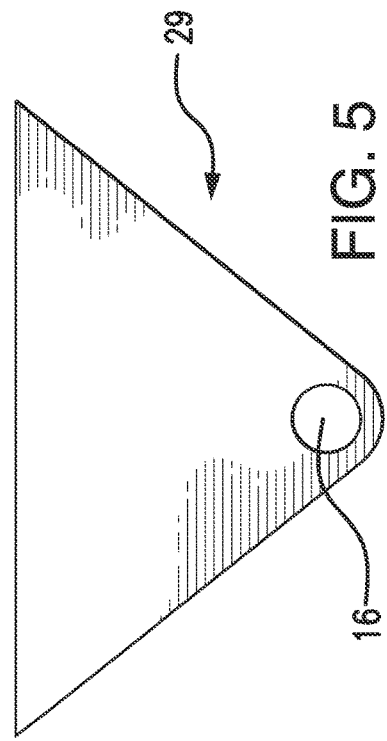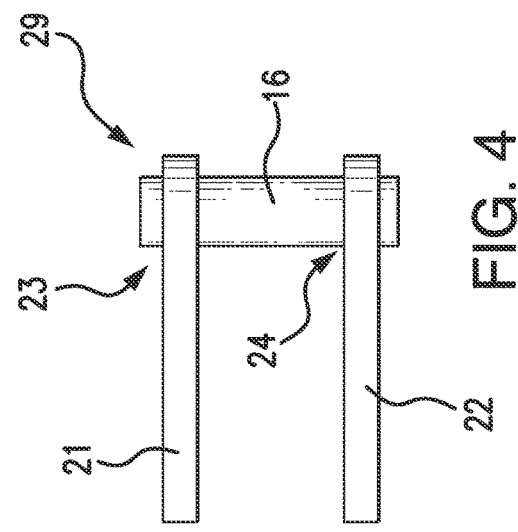

RECEIVERS FOR A HEAVY DUTY LOCKING AND PUSHING ASSEMBLIES

BACKGROUND OF THE INVENTION

The need for an assembly that would enhance the movement of heavy vehicles, especially heavily loaded farm vehicles is well-known.

Typically, sugar beets, and the like, are harvested by a harvester and moved into large truck beds for hauling to market. This loading is done in the field as the harvester moves along the rows to harvest the beets. At some point in time, the hauling vehicle, such as the truck itself, or a pup that is attachable to the truck, is fully loaded and needs to be hauled to market, such as a receiving station for the beets. This movement problem is ever more severe when the fields are wet, or muddy.

Typically, the hauling truck is pulled or pushed out of the field to get it to solid ground, such as a paved road, or tarmac where the fully loaded truck is enabled to move on its own.

This is accomplished in a variety of ways by a variety of means such as, by a second vehicle towing the loaded vehicle, or a second vehicle pushing the loaded vehicle without a means of keeping the vehicles aligned. This is not a very convenient, way to do this job, and is a high risk safety factor One such alternate means is shown in U.S. Pat. No. 4,266,798 that issued to Smith on May 12, 1981, in which there is shown a push-pull coupling for wheel supported power scrapers. It should be noted that this device is a push-pull device as opposed to the push device of the instant invention, the reason for that becoming clear upon further explanation set forth infra.

A second vehicle is disclosed in U.S. Pat. No. 7,591,477 that issued to Pohler on Sep. 22, 2009, in which there is shown a system for capturing a vehicle. Such a device is mounted on the front of a first vehicle for deploying a grasping hook for grasping the rear bumper of a second vehicle.

THE INVENTION

Thus, what is disclosed and claimed herein is a receiver for a heavy duty pushing assembly. The receiver comprises a top plate and a bottom plate, wherein the top plate and the bottom plate are spaced apart from each other a predetermined distance. The top plate and the bottom plate have a center point. There is an indention in the bottom plate vertically aligned with a second indention in the top plate at about the center point. The top plate and the bottom plate have common end plates.

There is surmounted on the top surface of the bottom plate, a trigger, the trigger being rotatably mounted adjacent to and on one side of the indention with a pin through a lower end. There is a lock. The lock is rotatably mounted on a pin through a center point, adjacent to and near a side of the indention opposite the trigger. The trigger and the lock are each forced together by respective springs. The trigger is moveable by an attached pneumatic cylinder. The pneumatic cylinder is controlled by an electric/air valve and air.

There is a second embodiment wherein the receiver is controlled by remote control.

In a third embodiment, there is a combination of the receiver and a pushing assembly. The pushing assembly comprises a clevis formed from a top plate and a bottom plate wherein the top plate and the bottom plate are spaced apart a predetermined distance.

There is a front end of the top plate and a front end of the bottom plate, each having an opening through them near a front edge of each of the bottom plate and the top plate.

There is a push shaft wherein a first end of the push shaft is inserted and fixed in the opening in the top plate and a second end of the push shaft is inserted and fixed in the opening of the bottom plate.

BRIEF DESCRIPTION OF THE DRAWINGS

FIG. 1 is a full top view of the receiver with the top plate removed to show the internal components with pneumatic assist.

FIG. 2 is a full front edge view of the receiver of this invention.

FIG. 3 is a full top view of the spacer plate used to connect the receiver to a vehicle.

FIG. 4 is a full side view of the pusher shaft in a clevis.

FIG. 5 is a full to view of the pusher shaft and clevis.

DETAILED DESCRIPTION OF THE DRAWINGS

With regard to FIG. 1, there is shown a full, top view of the receiver 1 of this invention with the top plate 2 removed to show the internal components and the pneumatic assist.

There is shown the lock 3, with a pin 4 around which the lock 3 rotates. In addition, there is shown a trigger 5 having a pin 6 around which the trigger 5 rotates. Both the lock 3 and the trigger 5 are spring loaded, for example spring 7 is on bolt 8 for the lock 3 and the spring 9 is on bolt 10 for the trigger 5. There is an indention 31 in the back of the trigger 5 for alignment of the spring in the trigger 5, and there is an indention in the back of lock 3 for alignment of the spring in the lock 3. The nut 33 and the nut 34 are welded on to the surface of the bottom plate.

There is further shown a pneumatic cylinder 11, which powers and withdraws the trigger 5 when commanded. The pneumatic cylinder 11 has a valve 12. The valve 12 and pneumatic cylinder 11 are controlled via pneumatic air from a reservoir, which is not shown but is housed on or near the vehicle on which the receiver 1 is used.

The top plate 2 is shown in FIG. 2, along with the lock 3, pin 4, trigger 5, pin 6, spring 7 on bolt 8 and spring 9, with indention 31 in trigger 5, bolt 10, and top plate 2. Also shown in FIGS. 1 and 2 are the indentions 14 and 15 that act as the receiving part of the receiver 1 that receives the pushing shaft 16 (FIG. 1, FIGS. 4 and 5).

FIG. 3 shows the spacer panel 17 that is used to keep the receiver 1 spaced from the tail end of the vehicle on which it is mounted in order to prevent damage to the components that make up the tail end of the forward vehicle (hauling vehicle). The spacer panel 17 is rigidly mounted on the underside of the vehicle. Typically, the spacer panel 17 and the receiver 1 are mounted on support bars 18. The support bars can be mounted on I-beams (not shown) that form part of the support for the vehicle by using bolts, or by welding the support bars 18 to the I-beams of the hauling vehicle.

In addition, the support bars 18 are provided in a length that will extend over the ends 19 and 19' of the receiver 1 so that the receiver 1 can be bolted or welded to the support bars 18. For example, bolts 20 are shown in FIG. 3, partially in phantom.

Turning now to FIG. 4, there is shown a full side view of the pusher assembly 29 of this invention, consisting of a top plate 21 and a bottom plate 22 that form a clevis. The plates are fixedly attached to a pushing vehicle front end. There is a pusher shaft 16 mounted in openings 23 and 24, respectively, in the clevis plates 21 and 22.

The pusher assembly 29 is attached to the front end of a pushing vehicle using similar means as is used to attach the receiver 1 to the vehicle being pushed.

Now it should be noted by those skilled in the art that there is a lot of pressure on the receiver 1 and the pusher assembly 29 and thus, these components are manufactured from very thick metal such as steel or iron. It is preferred to have the diameter of the pusher shaft 16 to be at least one and one-half inches, while the top plate 21 and bottom plate 22 are also preferred to be manufactured out of at least one inch thick steel or iron. The receiver plates are also preferred to be manufactured out of at least one inch thick steel or iron and the trigger and lock components are manufactured from 2 inch thick steel.

The device of this invention has been shown and disclosed as being a self-locking pusher, as opposed to a pusher and puller and this is for safety reasons.

In pulling a heavily loaded farm vehicle unto the road from the field, the lead vehicle, or the towing vehicle has to enter the road way in order to move the heavily loaded hauling vehicles unto a solid surface. Usually, this means that the road is blocked or partially blocked and interferes with moving vehicles on the roadway. When pushing from the back, this event does not occur.

Further, the device of this invention is designed such that the components of the receiver 1 will guide the pusher shaft into the indentions.

Thus, the receiver 1 is equipped with a pneumatic cylinder 11 and cable 28 that will allow the withdrawal of the trigger 5 to unlock the trigger 5. This is accomplished by pressure of the trigger 5 against the end of the lock at point 26 by means of the spring 7. It is preferred that the trigger 5 has a notch 27 to accommodate the terminal end 26 of the lock 3. The number 30 designates the lines that function the pneumatic air cylinder and electrical wires that function the valve 12.

The pneumatic cylinder 11 will allow the operator of the loaded vehicle to disengage the pusher shaft 16 by opening the lock. The pneumatic cylinder 11 withdraws the cable 28 which pulls the trigger 5 back from the lock 3. The pusher shaft 16 is now free from the receiver 1. The hauling vehicle is now free to go on its own power.

What is claimed is:

1. Receiver for a heavy duty locking and pushing assembly, said receiver comprising:
   i. a top plate;
   ii. a bottom plate, said top plate and said bottom plate being spaced apart from each other a predetermined distance, said top plate and said bottom plate having a center point, there being first indention in said bottom plate vertically aligned with a second indention in said top plate at about said center point, said top plate and said bottom plate having common end plates; surmounted on a top surface of said bottom plate,
   iii. a trigger, said trigger being rotatably mounted adjacent to and on one side of an indention on back of the trigger with a first pin through a lower end thereof;
   iv. a lock, said lock being rotatably mounted on a second pin through a center point thereof, adjacent to and near a side of an indention on back of the lock opposite said trigger;
   v. said trigger and said lock each being forced together by respective springs;
   vi. said trigger being moveable by an attached pneumatic cylinder, said pneumatic cylinder being controlled by an air valve and air.

2. The receiver as claimed in claim 1 wherein, in addition, the air and air valve is controlled by remote control.

3. In combination, the receiver s claimed in claim 1 and a pushing assembly, said pushing assembly comprising:
   i. a clevis formed from a clevis top plate and a clevis bottom plate, said clevis top plate and said clevis bottom plate being spaced apart a predetermined distance;
   ii. a front end of said clevis top plate and a front end of said clevis bottom plate, each having an opening therethrough near a front edge each of said clevis bottom plate and said clevis top plate;
   iii. there being a push shaft, a first end of said push shaft being inserted and fixed in said opening in said clevis top plate and a second end of said push shaft being inserted and fixed in said opening of said clevis bottom plate.

* * * * *